US011512005B2

United States Patent
Albornoz Wergertseder et al.

(10) Patent No.: US 11,512,005 B2
(45) Date of Patent: *Nov. 29, 2022

(54) SYSTEM AND METHOD FOR PROCESSING OF MINERALS CONTAINING THE LANTHANIDE SERIES AND PRODUCTION OF RARE EARTH OXIDES

(71) Applicant: REE UNO SPA, Santiago (CL)

(72) Inventors: Arturo Jose Domingo Albornoz Wergertseder, Santiago (CL); Arturo Patricio Rock Nunez, Santiago (CL)

(73) Assignee: REE UNO SPA, Santiago (CL)

(*) Notice: Subject to any disclaimer, the term of this patent is extended or adjusted under 35 U.S.C. 154(b) by 667 days.

This patent is subject to a terminal disclaimer.

(21) Appl. No.: 16/561,831

(22) Filed: Sep. 5, 2019

(65) Prior Publication Data
US 2021/0070627 A1    Mar. 11, 2021

Related U.S. Application Data

(63) Continuation of application No. 16/491,407, filed on Sep. 5, 2019.

(51) Int. Cl.
*B01D 11/02* (2006.01)
*C01F 17/20* (2020.01)
(Continued)

(52) U.S. Cl.
CPC ............ *C01F 17/206* (2020.01); *B01D 21/02* (2013.01); *B03D 3/00* (2013.01); *C22B 3/02* (2013.01);
(Continued)

(58) Field of Classification Search
CPC ...... C01F 17/206; C01F 17/247; C01F 17/10; C01F 17/17; C01F 17/20; C22B 3/02;
(Continued)

(56) References Cited

U.S. PATENT DOCUMENTS 3,252,754 A * 5/1966 Kraitzer ................. C22B 59/00
423/17
3,455,646 A * 7/1969 Morton .................... C01F 17/13
423/21.5
(Continued)

FOREIGN PATENT DOCUMENTS

CN    103789561 A  *  5/2014  ............. Y02P 10/20
CN    105695741 A  *  6/2016  ............. C22B 3/14
(Continued)

OTHER PUBLICATIONS

Fierro et al., "Preparation and Characterization of the Catalytically Active Forms of Rare Earth Oxides", Journal of Colloid and Interface Science, vol. 100, No. 2, Aug. 1984 (Aug. 1, 1984), pp. 303-310.

(Continued)

*Primary Examiner* — Joseph W Drodge
(74) *Attorney, Agent, or Firm* — Hoglund & Pamias, PSC; Roberto J. Rios

(57) ABSTRACT

The invention relates to a system and a method for the processing of minerals containing the lanthanide series and the production of rare earth oxides, which allow a completely closed and continuous treatment of the different materials and desorbent agents involved in the process, thus improving the efficiency in the extraction and avoiding environmental risks associated. The method comprising the steps of: reception and conditioning of the raw material; desorption of valuable product through a plurality of mixing and reaction stages in which the raw material is contacted in countercurrent with a stream of desorbent solution; separation of fine solids; precipitation of secondary minerals through the use of a first reactive solution; precipitation of rare earth carbonates through the use of a second reactive solution; and drying and roasting of the rare earth carbonates to obtain rare earth oxides; wherein the method further (Continued)

comprises a secondary process that allows further processing of the residual mineral, and a dewatering and washing step wherein the residual mineral from the desorption step is washed and a lanthanide-containing liquid is recovered.

14 Claims, 5 Drawing Sheets

(51) Int. Cl.
| | | |
|---|---|---|
| *B01J 23/10* | (2006.01) | |
| *B01J 6/00* | (2006.01) | |
| *B01D 21/02* | (2006.01) | |
| *B03D 3/00* | (2006.01) | |
| *C01F 17/206* | (2020.01) | |
| *C22B 3/02* | (2006.01) | |
| *B01D 11/00* | (2006.01) | |

(52) U.S. Cl.
CPC ...... *B01D 11/0257* (2013.01); *B01D 11/0288* (2013.01); *B01D 2011/002* (2013.01); *B01J 6/001* (2013.01); *B01J 23/10* (2013.01); *B03D 2203/02* (2013.01)

(58) Field of Classification Search
CPC .. C22B 3/44; C22B 59/00; C22B 1/00; C22B 3/00; C22B 3/04; C22B 3/06; C22B 3/20; C22B 3/22; B01D 11/0257; B01D 11/0288; B01D 2011/002; B01D 11/028; B01D 11/0284; B01D 15/08; B01D 35/02; B01D 36/00; B01D 63/02; B01D 63/025; B01D 63/04; B01D 63/10; B01D 2311/2626; B01D 2311/263; B01D 2311/2649; B01D 21/02; B01D 21/245; B01J 6/001; B01J 23/10; B01J 6/00; B01J 19/18; B01J 19/1862; B01J 19/24; B01J 19/242; B01J 19/245; B01J 2219/0059; B01J 2219/0075; B01J 2219/00754; B01J 2219/00905; B01J 2219/00909; Y02P 10/20; C02F 1/001; C02F 1/004; C02F 1/26; C02F 1/44; C02F 1/441; C02F 1/52; C02F 1/5209; C02F 1/5236; C02F 1/62; C02F 2103/10; C02F 2103/16; C02F 2103/20; C02F 2103/203; B03D 3/00; B03D 2203/02; B03D 2203/025

See application file for complete search history.

(56) References Cited

U.S. PATENT DOCUMENTS

| | | | | |
|---|---|---|---|---|
| 5,439,656 | A * | 8/1995 | Kimura | C01F 17/224 |
| | | | | 423/263 |
| 5,534,160 | A * | 7/1996 | Hong | C01F 17/206 |
| | | | | 210/915 |
| 5,879,647 | A | 3/1999 | Wataya et al. | |
| 2007/0107318 | A1 | 5/2007 | Oh et al. | |
| 2011/0182786 | A1* | 7/2011 | Burba, III | C22B 34/34 |
| | | | | 423/90 |
| 2011/0280778 | A1 | 11/2011 | Huang et al. | |
| 2015/0225808 | A1* | 8/2015 | Boudreault | C22B 23/0423 |
| | | | | 423/103 |
| 2016/0045841 | A1* | 2/2016 | Kaplan | C01B 32/05 |
| | | | | 429/49 |
| 2017/0204499 | A1* | 7/2017 | Dreisinger | C22B 1/00 |
| 2017/0260606 | A1* | 9/2017 | Kasaini | C22B 60/0278 |
| 2018/0245182 | A1* | 8/2018 | Park | B03C 1/02 |
| 2018/0371578 | A1* | 12/2018 | Liddell | C22B 3/44 |

FOREIGN PATENT DOCUMENTS

| | | | | |
|---|---|---|---|---|
| CN | 106367622 | A * | 2/2017 | ........... C22B 3/0012 |
| CN | 108913918 | A * | 11/2018 | |
| CN | 11393354 | A * | 1/2022 | ............. G01N 27/08 |

OTHER PUBLICATIONS

Moldoveanu et al., "Recovery of rare earth elements adsorbed on clay minerals: I. Desorption mechanism", HYDROMETALLURGY, vol. 117-118, Feb. 16, 2012 (Feb. 16, 2012), pp. 71-78.
Yada et al., "Rare Earth (Er, Tm, Yb, Lu) Oxide Nanotubes Templated by Dodecylsulfate Assemblies", Advanced Materials, vol. 14, No. 4, Feb. 19, 2002 (Feb. 19, 2002), pp. 309-313.

* cited by examiner

SYSTEM AND METHOD FOR PROCESSING OF MINERALS CONTAINING THE LANTHANIDE SERIES AND PRODUCTION OF RARE EARTH OXIDES

CROSS-REFERENCE TO RELATED APPLICATIONS

This application is a continuation of U.S. patent application Ser. No. 16/491,407, filed Sep. 5, 2019, entitled "SYSTEM AND METHOD FOR PROCESSING OF MINERALS CONTAINING THE LANTHANIDE SERIES AND PRODUCTION OF RARE EARTH OXIDES", which is a national stage application of PCT application No. PCT/IB2017/051339, filed Mar. 7, 2017, entitled "SYSTEM AND METHOD FOR PROCESSING OF MINERALS CONTAINING THE LANTHANIDE SERIES AND PRODUCTION OF RARE EARTH OXIDES", the foregoing applications are hereby incorporated by reference in their entirety.

FIELD OF THE INVENTION

The present invention relates to the industry of extraction and processing of lanthanides. In particular, the present invention relates to a completely closed and continuous process for the extraction, purification and production of oxides of elements of the lanthanide series, with the object of improving the efficiency over the recovery of ore and reducing the environmental impact in the place of interest.

BACKGROUND OF THE INVENTION

In recent years the interest in so-called rare earths, and more specifically the elements of the lanthanide series, has grown considerably mainly because of its uses related with technological developments. These elements are used in applications as diverse as catalytic converters for vehicles, wind turbine generators, electronic devices and even in bills to detect forgeries by ultraviolet radiation.

However, the extraction of these elements is relatively complex, because in ore reservoirs these elements are usually mixed with other geological materials, making it difficult to extract them individually. For this reason, it is necessary to use several chemical products that may act as a source of contamination in the vicinity of the mine, generating acidic or radioactive materials.

This is mainly due to the way in which is commonly processed this mineral, since it is carried out mainly through two methods: by in situ desorption and by heap leaching. In the in situ desorption method, a series of wells are drilled directly into the reservoir, through which a desorbent agent is injected that is subsequently captured at the base of the wells. On the other hand, in the heap leaching process, piles are constructed with the material of interest, which are irrigated with the desorbent agent, which percolates and later being captured in the base of the pile.

As can be seen, both types of processing consider the use of chemicals in an "open" environment, potentially constituting an environmental risk in the areas near the mine, which may affect, for example, nearby vegetation or watercourses.

Additionally, while conventional methods for the production of rare earth or lanthanides concentrates are inexpensive, they have low recovery rates and environmental risks. Regarding to the in situ desorption, the greatest risk is the contamination of groundwater due to the injection of the desorbent agent directly into the soil, which is avoided in the second method due to the waterproofing of the soil where the piles are constructed. Regarding the heap leaching process, a large pile must be made so that the production of minerals can be attractive, which implies affecting a large surface, generating a change in the topography of the place. Both methods have recovery rates of about 75% of the content of mineral in the reservoir.

In view of the above, a need can be identified in the state of the art of having a technology for the extraction and processing of lanthanides, able to treat the different materials and desorbent agents in a closed and continuous environment, thereby improving the efficiency in the extraction and processing of ore and avoiding the environmental risks associated.

An example of the prior art describing a system for the extraction of rare earths is disclosed in the patent document number CN 102277493, which discloses the use of an extraction tank, so as to carry out the process in a closed environment. The document discloses a method comprising: filling a fixed amount of rare earth aqueous solution serving as heavy liquid into an extraction tank from a heavy liquid inlet on the top of the extraction tank; starting a stirring shaft; allowing an extracting agent serving as light liquid to uniformly enter the extraction tank, stirring to allow the light liquid and heavy liquid to mix and transfer mass; clarifying the light phase liquid in the clarifying tank; detecting the concentration of required rare earth elements in the light component solution discharged from the clarifying tank and judging if the leaching or extraction is finished. After the leaching or extraction is finished, stopping inputting light liquid, opening an emptying valve below the clarifying tank to empty the clarifying tank; and discharging the heavy liquid in the extraction tank from a heavy liquid outlet at the bottom of the extraction tank.

It can be seen that the above document discloses a system for the extraction of rare earth where leaching is not used in piles or in situ, but the process is carried out in an extraction tank and a clarification tank. However, the described system and method are very basic, lacking of different elements and operational steps that could allow an efficient and continuous processing. Particularly, the system and method are based on the use of a single extraction tank and a single clarification tank, in which rare earth processing is carried out. In addition, the invention disclosed in this document is a batch type process, which differs from a continuous and efficient extraction process.

In view of the above problems, there is a need in the state of the art of providing a completely closed and continuous system for the extraction, purification and production of rare earth oxides, in order to improve the efficiency in ore recovery and minimizing the environmental impact in the place of interest.

SUMMARY OF THE INVENTION

To solve the mentioned problems, a system and methodology for processing and recovering lanthanides from a particular type of ore—ion-clays—is presented, which allows a completely closed and continuous treatment of the different materials and desorbent agents that intervene in the process, thus improving the extraction efficiency and the environmental risks.

Particularly, the method of the present invention comprises the following steps:

a) reception and conditioning of the raw material;

b) desorption of valuable product through a series of mixing and reaction stages, wherein the raw material is contacted in countercurrent with a stream of a desorbent agent;

c) separation of fine solids;

d) precipitation of secondary minerals through the use of a first reactive solution;

e) precipitation of rare earth carbonates through the use of a second reactive solution; and f) drying and roasting of rare earth carbonates to obtain rare earth oxides;

In addition, the method includes a secondary process which allows further processing the residual mineral from the previous steps, and also includes a dewatering and washing step wherein the depleted ore is washed and a liquid with rare earth contents is recovered.

Thus, with the method described above, it has been possible to reduce the size of the equipment and washing the clays with fresh water, thereby reducing sulfate and desorbed soil losses, and also allowing the recirculation of the desorbent solution at various stages of the process. In preferred embodiments of the invention, the stream recirculated into the mixing section corresponds to a fraction in the range of 75-90% of the outflow stream of the coarse solids separation stage, at the outlet of the mixing section.

In order to avoid environmental impact, the depleted mineral is washed in countercurrent, from which the solids finally returns to the quarry and a liquid stream is obtained containing rare earth and ammonium, more diluted than in the main process, which is sent to the secondary process operating in parallel and including stages of separation of fine solids, precipitation of secondary minerals, and precipitation and filtration of rare earth carbonates. The secondary minerals stream and the carbonates filtered from this secondary process are sent to the main process for their filtration and calcination, respectively. The liquid resulting from the secondary process is carried to a reverse osmosis plant, where is obtained a concentrated ammonium stream, which returns to the main stream, and a stream with diluted elements (or "pure water"), which is used for washing the depleted ore.

The present invention further includes a system for carrying out the steps of the method described above, comprising: means for receiving and conditioning the raw material; means for the desorption of valuable product comprising a plurality of mixing and reaction means wherein the raw material is contacted in countercurrent with a stream of a desorbent agent; means for the separation of fine solids; means for the precipitation of secondary minerals with the use of sodium sulfide or ammonium bicarbonate; means for the precipitation of rare earth carbonates with the use of ammonium bicarbonate; and calcination means to obtain rare earth oxides. In addition, the system also comprises a secondary system which allows for further processing of the residual mineral from the main system, and dewatering and washing means in which a liquid with rare earth contents is recovered from the residual mineral from the desorption means.

The means for receiving and conditioning the raw material include means for transporting the material, which supply the raw material to feed hoppers including filtration media, such as metal grids, to prevent the entry of unwanted elements, such as stones, branches or other objects. The feed hoppers in turn supply the material to mixing chambers.

The desorption means comprises a plurality of reactors, wherein the material is desorbed in different stages, which can be connected in series and/or in parallel, and in countercurrent with an ammonium sulfate solution, thus contacting in several stages the coarse solids from the step of reception and conditioning of the raw material with the desorbent solution. The recovered coarse solids are carried to dewatering tables, whereas the stream of clarified liquid flows into a recirculation chamber.

The fine solids separating means comprises fine particles settlers, which are fed by the clarified liquids from the recirculation chamber, and where the small particles are separated with the aid of flocculants. The clarification obtained in these equipment is sent to a loading chamber and in order to carry out then the precipitation of secondary minerals.

The secondary mineral precipitation means comprise a chamber that receives the clarified stream coming from the fine solids settlers, where it is contacted with an ammonium bicarbonate solution in order to precipitate the secondary minerals present in the liquid solution. In this manner, the unwanted metals such as aluminum, iron, lead, etc. are precipitated in the form of hydroxides. This system further comprises secondary mineral settlers, which receive the liquid stream from the mentioned chamber, and in which is obtained a wet solid with precipitates of secondary mineral and a clarified liquid which continues the process.

The rare earth carbonates precipitation means comprises a chamber which receives the clarified stream from the secondary mineral precipitation means and wherein it is contacted with an ammonium bicarbonate solution in order to precipitate rare earth carbonates. From this chamber the liquid stream flows to a rare earth carbonate settlers, which allow the precipitation of rare earth carbonates.

The calcination means include drying furnaces which receive the wet earth rare carbonates, where they are preferably heated to a temperature of 105° C. Afterwards, the cooled carbonates are then transported to calcination furnaces which convert the carbonates into rare earth oxides. Preferably, the calcination process is carried out for about 6 hours at a temperature of about 950° C.

DETAILED DESCRIPTION OF THE INVENTION

Figure 1:
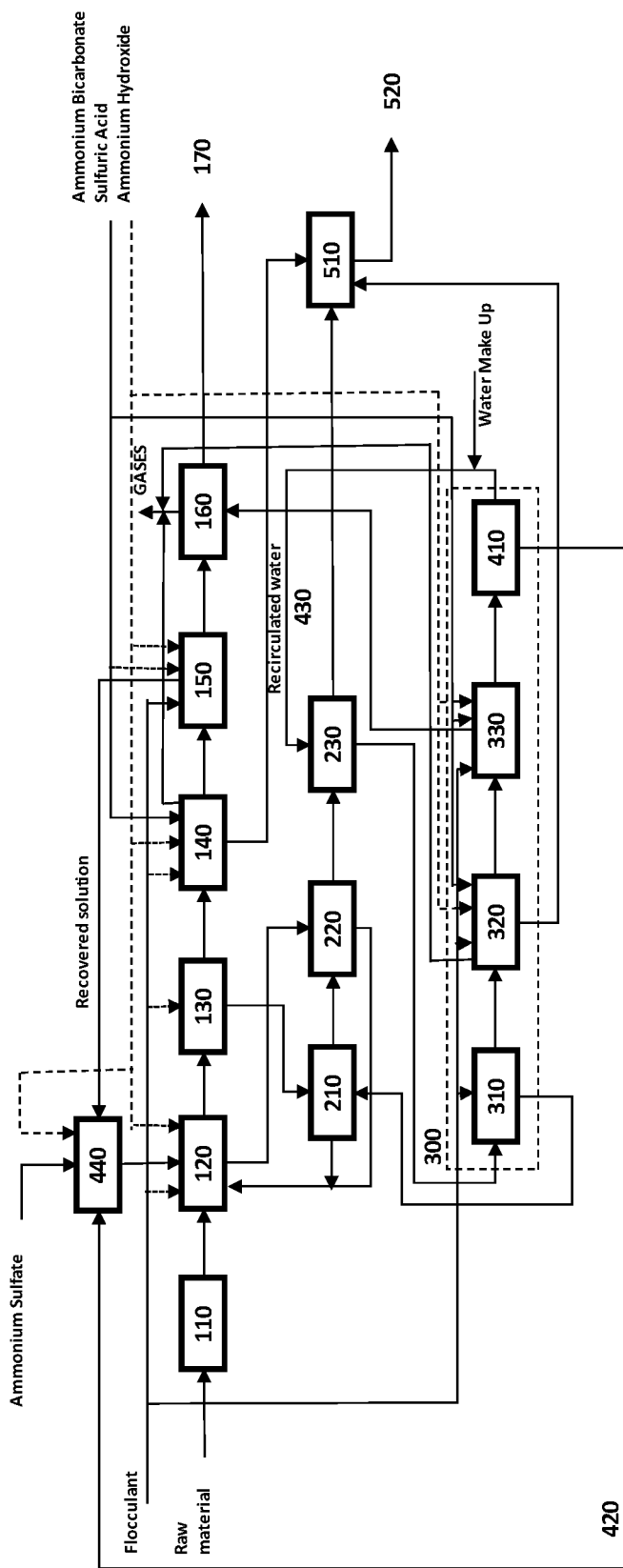
FIG. 1 shows a flowchart of each of the steps of the method for the processing of rare earth oxides according to the present invention.

As shown in FIGS. 1 to 5, the present invention relates to a system and method for processing minerals of the lanthanide series and the production of rare earth oxides, which allows a completely closed and continuous treatment of the different materials and desorbent agents involving the process, thus improving the extraction efficiency and avoiding environmental risks.

The method of the present invention comprises the steps of:
a) reception and conditioning of the raw material (110);
b) desorption of valuable product (120) through a plurality of mixing and reaction stages in which the raw material is contacted in countercurrent with a stream of desorbent solution;
c) separation of fine solids (130);
d) precipitation of secondary minerals (140) through the use of a first reactive solution;
e) precipitation of rare earth carbonates (150) through the use of a second reactive solution; and
f) drying and calcination of the carbonates to obtain rare earth oxides;
wherein the method further comprises a secondary process (300) which allows further processing the residual mineral from the previous steps, and also includes a dewatering (230) and washing step (220) wherein the depleted ore is washed and a liquid containing lanthanides is recovered.

Preferably, the stream of desorbent solution used in the valuable product desorption step (120) corresponds to an ammonium sulfate solution. In addition, the first reactive solution used in the secondary mineral precipitation step (140) preferably corresponds to ammonium bicarbonate, while the second reactive solution in the rare earth carbonate precipitation step (150) also corresponds to ammonium bicarbonate.

The step of receiving and conditioning of the raw material (110) comprises receiving the material from the extraction zone in one or more feed chambers or hoppers (111) operating in parallel, and further comprises conditioning the material through the use of filtration means in each of said feed hoppers. The filtration means preferably corresponds to metal grids or other filtration means, preferably a mesh of 100 mm, to prevent the entry of unwanted stones, branches or other objects. The material is discharged through the bottom of the hoppers into means that carries the material to a plurality of reactors (121) which may have other filtration means at their upper end, such as 25 mm grids, to prevent the entry of unwanted materials. The inflow of material into said plurality of reactors initiates the step of valuable product desorption (120).

In the step of desorption of valuable product (120) the reactors receive the ore from the feed chambers (111), initiating successive steps of desorption arranged in series, where the material is contacted in countercurrent with an ammonium sulfate solution. Preferably, the step of desorption of valuable product is carried out in two successive stages, through a plurality of primary reactors connected in series with a plurality of secondary reactors.

Figure 2:
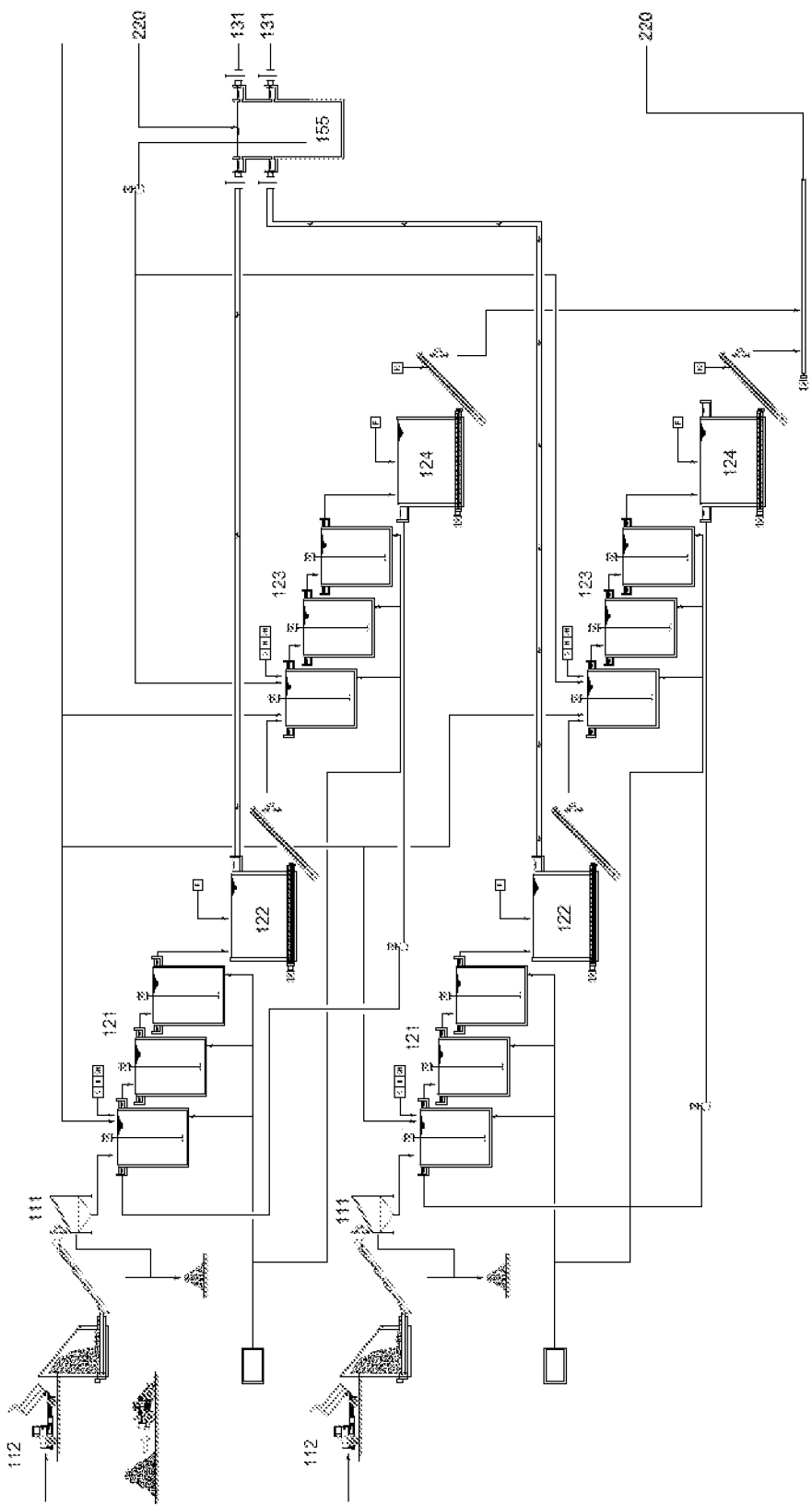
FIG. 2 shows a scheme of the different means used in the steps of mixing and reaction of the raw material in the method of FIG. 1.

As shown in FIG. 2, the desorption step is initiated with the inflow of material into the primary reactors (121) where it is mixed with a desorbent solution coming from a secondary grit separator (124) to carry out a step of primary desorption. Subsequently, the material is discharged from the primary reactors (121) to a primary grit separator (122), where the clarified liquid and the solid material are separated, after the primary desorption. The material is then discharged from the primary grit separator (122) into the secondary reactors (123), where a secondary desorption step is carried out, contacting said material with a fresh desorbent solution.

Preferably, during the step of desorption of valuable product, the mass ratio between the solid entered into the system and the desorbent solution is 1:3.

As shown in FIG. 1, the ammonium sulfate solution required for desorption comes from a desorbent recovery tank (440).

The primary and secondary reactors are designed with a useful capacity that ensures a residence time to disperse the solid material and initiate desorption. In preferred embodiments of the invention residence time at this stage is 30 minutes. In addition, to ensure the pH conditions in the desorption step, sulfuric acid or ammonium hydroxide may optionally be added as appropriate.

The coarse solids corresponding to the residual material at the outlet of the secondary grit separator (124) are transported by means of any conveyor means, such as a conveyor belt, to dewatering tables (221) in the step of dewatering (230) and washing (220). The clarified liquid streams leave the reactors at their upper end and flow into a recirculation chamber (155).

Figure 3:
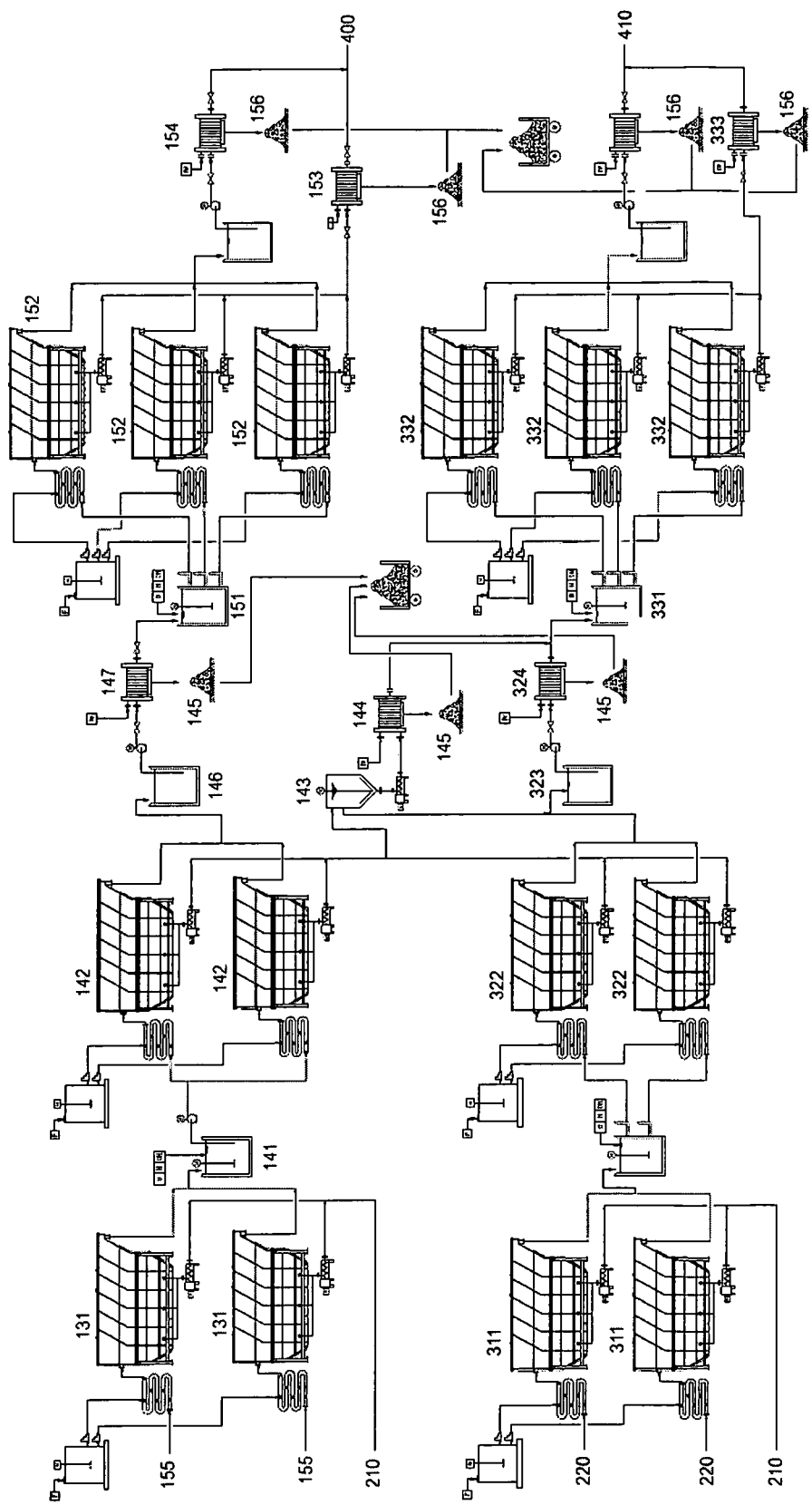
FIG. 3 shows a scheme of the different means used in the steps of fine solids separation, precipitation of secondary minerals, and rare earth carbonates precipitation, for the method of FIG. 1.

In the step of fine solids separation (130), the clarified liquid coming from the step of desorption of valuable product (120) is distributed from the recirculation chamber (155) to two or more fine particulate settlers (131), where the small particles are separated with the aid of flocculant. It is possible to use one or more settlers in parallel, in order to allow a greater capacity (as represented in FIG. 3). In preferred embodiments of the invention, the minimum residence time at this stage is about 60 minutes.

On the other hand, as can be seen in the scheme of FIG. 3, the clarified liquid obtained in the settlers (131) is sent to a loading chamber (141) in order to initiate the step of precipitation of secondary minerals (140).

Figure 4:
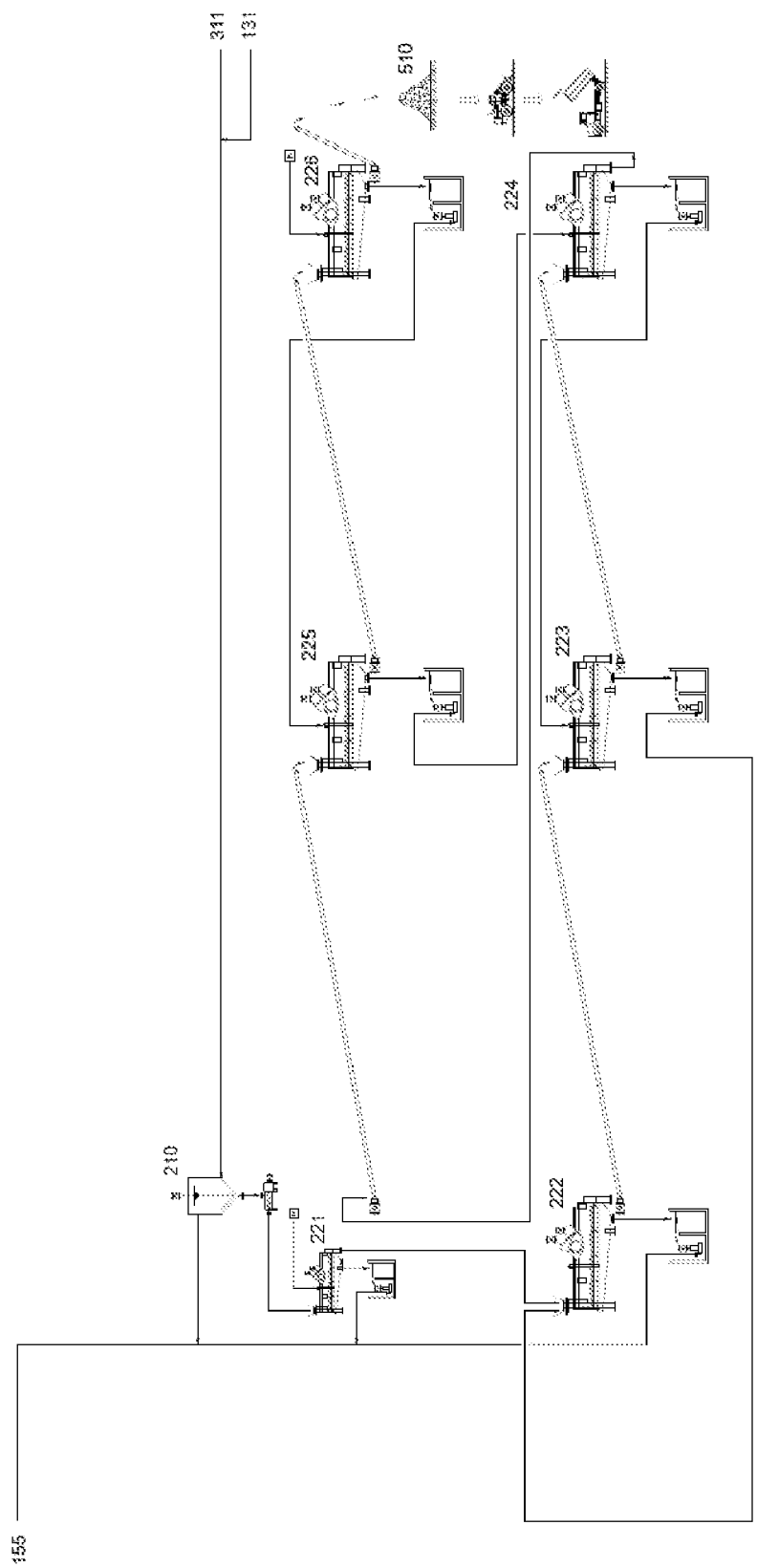
FIG. 4 shows a scheme of the different means used in the dewatering and washing steps for method of FIG. 1.

As shown in FIGS. 3 and 4, the material accumulated at the bottom of each fine particulate settler is sent to a dynamic thickener (210), from which a stream of material with lower moisture is obtained, which is sent to a first dewatering table (221) in the dewatering (230) and washing step (220). At this dewatering table the moisture is further reduced and the resultant fine solids stream is directed to a second dewatering table (222) connected in series with the first one. As shown in FIGS. 2 and 4, the liquid resulting from the operation of the dewatering tables is reincorporated into the step of desorption (120).

In the step of precipitation of secondary minerals (140) the clarified liquid from the fine solids settlers (131) is fed into the loading chamber (141) where it is contacted with a reactive solution which preferably corresponds to ammonium bicarbonate, in order to precipitate the secondary minerals present in the liquid solution. Because of the use of this reactive solution, unwanted metals such as aluminum, iron, lead, or the like are precipitated in the form of hydroxides. As in other stages, the pH adjustment is achieved with the addition of sulfuric acid or ammonium hydroxide, as appropriate, and the range of pH is about 5.0. Optionally, to obtain a better mixing this chamber can include a stirrer.

From this chamber two streams of liquid are sent to secondary mineral settlers (142). Preferably, in these secondary mineral settlers the residence time is around 60 minutes for the precipitation of particles. In addition, both the secondary mineral settlers and the fine solids settlers preferably correspond to lamellar settlers.

In the rapid agitation zone of each secondary mineral settler (142), flocculant is added by corresponding metering pumps.

The bottom with secondary mineral concentrate obtained from the sedimentation zone of each settler (142) is sent to a dynamic thickener (143) where the precipitation is finished. To this dynamic thickener can also come the bottoms of the settlers of secondary minerals of the secondary process (322). The liquid resulting from the dynamic thickener (143) is sent to the reprocessing tank (400), while the solid material accumulated in the thickener is pumped to a filter (144), from which is obtained a liquid stream that can be sent to the reprocessing tank, and a wet solid with precipitates of secondary minerals (145).

The clarified product of the secondary mineral settlers (142) is directed to a corresponding loading tank (146), from which it is fed to polishing filters (147), to remove solids that may have been entrained through the settlers and to ensure a liquid free of particles. In this manner, finally a liquid stream is obtained which is sent to a loading chamber (151) so as to continue the process, and a wet solid is also obtained with secondary mineral precipitates (145). As shown in FIG. 1, the precipitate of secondary minerals is incorporated into the depleted mineral (510).

In this stage of the process, optionally an industrial water line can be provided, considered in each filter to wash the solids before discharge.

In the step of precipitation of rare earth carbonates (150), the clarified liquid from the secondary mineral filters (147) is received in a chamber (151) where it is contacted with an ammonium bicarbonate solution in order to precipitate rare earth carbonates. The pH adjustment is achieved with the addition of sulfuric acid or ammonium hydroxide, as appropriate, and the pH adjustment is within the range of 6.5 to 7.5. Optionally, to achieve a better mixing the chamber can include an agitator.

From this chamber stream of liquid flow into rare earth carbonates settlers (152), which preferably have a residence time of about 1 hour for the precipitation of rare earth carbonates.

As shown in FIG. 3, the sedimentation zone at the bottom of each settler (152) contains concentrates of rare earth carbonates, which are sent to a filter (153), from which is obtained a concentrate of rare earth carbonates (156) and a liquid stream, which is sent to the reprocessing tank (400). On the other hand, the clarified liquid from the settlers (152) is sent to a fine solids filter (154) to remove solids that may have been entrained through the settlers and to ensure a liquid free of particulate. In this manner, a concentrate of rare earth carbonates (156) is recovered in the fine solids filter (154), while the resulting liquid is sent to the reprocessing tank (400). Both filters (153, 154) may optionally be shared with the streams of the secondary process (300), as will be described later.

Figure 5:
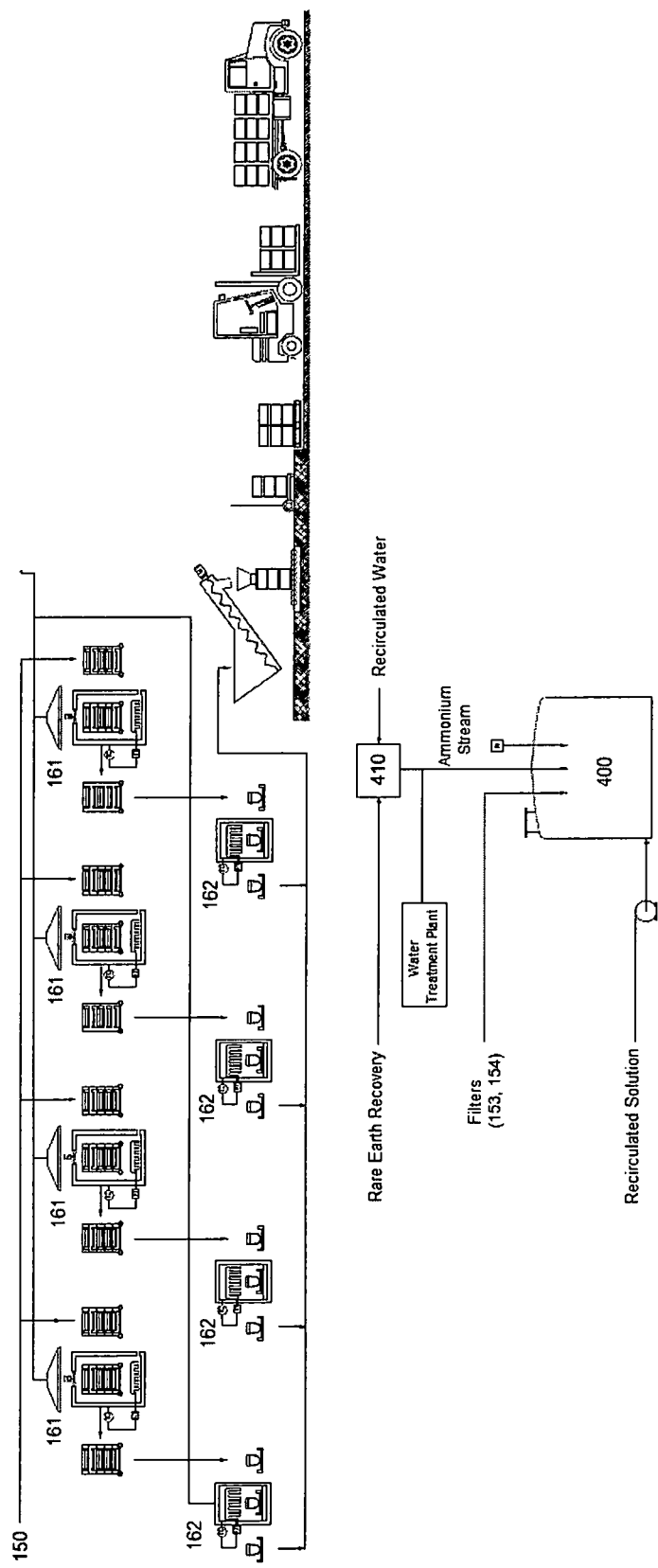
FIG. 5 shows a scheme of the different means used in the step of drying and calcination of the carbonates for the preparation of rare earth oxides, for the method of FIG. 1.

In the drying and calcination step 160, as shown in FIG. 5, the wet carbonates from the filters of the previous step (150), along with those from the secondary process (300), are directed to drying ovens (161), preferably electric ovens, where the carbonates are heated to a temperature of about 105° C. Thereafter, these carbonates are cooled and transferred, preferably in refractory brick crucibles, to calcination furnaces (162) to convert the carbonates into rare earth oxides. Preferably, the calcination process is carried out for about 6 hours at a temperature of 950° C.

To complete the processing of the lanthanides, optionally a packaging system may be available, which could consist of transport means to provide the rare earth oxides on drums or any appropriate storage means.

In the washing (220) and dewatering (230) step the depleted ore from the desorption step (120) is disposed in a variable number of serially connected dewatering tables (221, 222, 223, 224, 226), which are contacted with a stream of washing water (231) in countercurrent, in order to perform a washing process (230), as shown in FIGS. 1 and 4. In the first dewatering table (221) it is possible to reduce the humidity to 30%.

Preferably, the liquid obtained in the first dewatering table 221 is accumulated in a chamber, from which is pumped to the recirculation tank (155).

As shown in FIG. 4, the material discharged from the first table is sent to the next table (222), where it is washed in countercurrent with the liquid from the third table (223), and continues its washing process throughout the following tables to finally be accumulated in the mineral stack (510) which will be sent back to the mine (520). On the other hand, because of the countercurrent arrangement, the liquid from each table is accumulated in respective chambers from which is pumped to the next washing stage.

The resulting liquid from the dewatering tables contains lanthanides and ammonium, which is why it is accumulated in a chamber and is sent to the secondary process (300) for the recovery of the lanthanides (FIGS. 1 and 3).

As shown in FIG. 3, the secondary process (300) is similar to the main process, already described. From the final chamber of the washing step (220), the material is sent to a step of separation of fine solids of the secondary process (310) comprising fine solids setters (311), equal to those of the main process. Upon admission of the material to these equipment, flocculating agent is added, using metering pumps. The mud accumulated in these settlers is sent to the dynamic thickener (210).

The clarified liquid is sent to a loading chamber where the pH is adjusted and ammonium bicarbonate is added, initiating a step of secondary minerals precipitation of the secondary process (320), as shown in FIG. 1. Optionally, for a better mixing the chamber can include a stirrer.

From this loading chamber two liquid streams are sent to the secondary mineral settlers (322) of the secondary process, equal to those of the main process, where a flocculating agent is added.

The sedimentation zone of these settlers (322) having secondary mineral concentrate is sent to the dynamic thickener (143). The clarified liquid from the settlers is sent to a loading tank (323), from which it is directed to a filter (324), thereby obtaining a clarified liquid stream and a wet solid having secondary minerals precipitates (145).

Subsequently, a step of precipitation of rare earth carbonates is carried out in the secondary process (330), where the clarified liquid from the filter is received in a chamber (331), the pH is adjusted and ammonium bicarbonate is added. For better mixing the chamber can include a stirrer. Preferably, from this chamber three streams of liquid flow to the rare earth carbonates settlers (332), equal to those of the main process, where flocculant is added.

The sedimentation zone at the bottom of these carbonate settlers contains a concentrate of rare earth carbonates, which is directed to a filter (333), from which a wet solid is obtained with rare earth carbonates. The liquid stream in turn is directed to a water conditioning plant (410), from which is recovered an ammonia-concentrated stream, which returns to the main stream, and a stream of diluted elements (or "pure water"), which is used in the steps of washing (220) of clays. The carbonates are directed to the drying and calcination step (160) of the primary processing.

Additionally, the present invention also contemplates a system for the processing of rare earth oxides, which carries out the method described above, and comprising the following elements:

means for the reception and conditioning of the raw material;

means for the desorption of valuable product comprising a plurality of mixing and reaction equipment wherein the raw material is contacted in countercurrent with a stream of desorbent solution;

means for the separation of fine solids;

means for the precipitation of secondary minerals through the use of a first reactive solution;

means for the precipitation of rare earth carbonates through the use of a second reactive solution; and means for drying and calcination of rare earth carbonates to obtain rare earth oxides;

wherein the system further comprises a secondary system which allows further processing of the residual mineral from the main system, and dewatering and washing means wherein the residual mineral is washed and a liquid with contents of rare earth is recovered coming from the means for the desorption of valuable product.

The means for the reception and conditioning of the raw material includes material transport means (112) supplying the feedstock to the feed hoppers (111) already described above, operating in parallel and including filter media, such as metal grids, to prevent the entry of unwanted stones, branches or other objects.

The desorption means comprises the primary and secondary reactors (121, 123), wherein the material is desorbed in multiple stages connected in series and in countercurrent with a stream of ammonium sulfate solution. The primary and secondary reactors (121, 123) are connected to primary and secondary grit separators (122, 124), respectively, in which desorption is completed and the sedimentation of the coarse solids occurs. The recovered coarse solids are carried to a dewatering table (221), while the clarified liquid streams flow into the recirculation tank (155).

The fine solids separating means comprises fine particle settlers (131), connected with the recirculation chamber (155) to receive the clarified liquids. In these settlers the small particles are separated with the aid of flocculant, and are further connected with a loading chamber (141) where the clarified obtained is sent.

The means for the precipitation of secondary minerals comprises the loading chamber (141) wherein the clarified liquid from the fine solids settlers is contacted with a reactive solution, such as sodium sulfide or ammonium bicarbonate, in order to precipitate the secondary minerals. These precipitation means further includes secondary mineral settlers (142) which receive streams of liquid from the loading chamber (141), and in which is obtained a wet solid with precipitates of secondary minerals and a clarified liquid that continue the process.

The means for the precipitation of rare earth carbonates comprise a chamber (151) receiving the clarified liquid from the secondary mineral filters and where it is contacted with an ammonium bicarbonate solution in order to precipitate rare earth carbonates. From this chamber stream of liquid flow to the rare earth carbonates settlers (152), which allow the precipitation of rare earth carbonates.

The drying and calcination means comprises drying ovens (161) which receive wet rare earth carbonates, connecting then with calcination ovens (162), which convert the carbonates into rare earth oxides.

The washing and dewatering means (220, 230) comprise a variable number of dewatering tables, which in the configuration shown in FIG. 4 corresponds to six (221, 222, 223, 224, 225, 226), all connected in series and in contact with a backwash water stream.

The liquid obtained in the first dewatering table (221), which has passed through the previous tables, is accumulated in a chamber and from there is pumped into the recirculation tank (155). As shown in FIG. 4, the mineral discharged from the next dewatering table (222) is flushed in countercurrent with the liquid stream from the third table (223), and continues its washing process through the following tables to finally accumulate in the stack of depleted ore to be sent to a disposal area.

The secondary system (300) is similar to the main system. As shown in FIGS. 1 and 3, this system comprises means for the separation of fine solids of the secondary system (310) comprising fine solids settlers (311), equal to those of the main system. The clean clarified is sent to a loading chamber, from which liquid streams are sent to secondary mineral settlers of the secondary system (322), equal to those of the main system.

The means for the precipitation of rare earth carbonates of the secondary system comprises a chamber receiving the clean clarified, from which liquid streams flow towards the rare earth carbonates settlers of the secondary system (332), equal to those of the main system.

The sedimentation zone at the bottom of said carbonate settlers, which contains a rare earth carbonate concentrate, is connected to a filter, from which a wet solid is obtained with rare earth carbonates. On the other hand, the liquid stream is sent to the water conditioning plant (410), which will be detailed below.

In preferred embodiments of the invention, the system includes a water conditioning plant (410), wherein the liquid solution obtained after the precipitation of rare earth carbonates in the secondary process is treated. Preferably, this plant corresponds to a reverse osmosis plant, the purpose of which is to obtain a stream of water for the washing of depleted mineral at the last dewatering table, and also obtain an ammonia-concentrated stream for use as a desorbent solution, which is sent to the desorbent or reprocessing recovery tank (400) for subsequent recirculation.

The foregoing description relates to the embodiment of the figures, which corresponds to one of the preferred embodiments of the invention, however, it is important to consider that different aspects may vary. For example, the number of reactors used, such as those shown in FIG. 2, should not be limited exclusively to groups of 3 reactors connected in series, and the presence of a parallel processing of reactors and grit separators (shown in the lower part of FIG. 2). Similarly, the number of settlers in the stages of fine solids separation, secondary mineral precipitation, and rare earth carbonates precipitation is equally variable, all depending on the volume of raw material to be processed.

Finally, it should be noted that the dimensions, the choice of materials, and specific aspects of the preferred embodiments described above can be varied or modified depending on the design requirements. Accordingly, the description of the specific configurations described above are not intended to be limiting, and possible variations and/or modifications thereto are within the spirit and scope of the invention.

We claim:

1. A system for the processing of minerals of the lanthanide series and the production of rare earth oxides, comprising:

at least one feed hopper and at least one filter for the reception and conditioning of raw material;

a plurality of mixing and reaction devices in which the raw material is contacted with a stream of desorbent solution provided against a stream flow of said raw material for the desorption of valuable product;

at least one solid settler for the separation of fine solids;

a secondary minerals precipitation chamber and at least one settler for the precipitation of secondary minerals through the use of a first reactive solution;

a rare earth carbonates precipitation chamber and at least one settler for precipitation of the rare earth carbonates through the use of a second reactive solution; and at least one drying oven and at least one calcination oven for drying and calcination of the rare earth carbonates to obtain rare earth oxides, wherein the system further comprises a secondary system that allows further processing of residual mineral, and at least one dewatering table in contact with a water stream for the dewatering and washing of the residual mineral wherein the residual mineral is washed and a lanthanide-containing liquid is recovered.

2. The system of claim 1, wherein the at least one feed hopper and the at least one filter comprises a plurality of feed hoppers, for the reception and conditioning of the raw material and the system includes means for conveying the raw material to the feed hoppers.

3. The system of claim 1, wherein the plurality of mixing and reaction devices comprises primary and secondary reactors connected in series, where the raw material is mixed and desorbed in different stages with the desorbent solution.

4. The system of claim 3, wherein the desorbent solution comprises ammonium sulfate.

5. The system of claim 3, wherein the primary and secondary reactors are connected to primary and secondary grit separators, respectively.

6. The system of claim 1, wherein the at least one solid settler for the separation of fine solids comprises a plurality of fine solids settlers that receives clarified liquids from the plurality of mixing and reaction devices.

7. The system of claim 6, wherein the secondary minerals precipitation chamber and at least one settler comprises a plurality of secondary minerals settlers, which receive the clarified liquids from the fine solids settlers and are contacted with a reactive solution, in order to precipitate the secondary minerals.

8. The system of claim 7, wherein the reactive solution comprises ammonium bicarbonate.

9. The system of claim 7, wherein the rare earth carbonates precipitation chamber and at least one settler comprises a plurality of rare earth carbonate settlers, which receive the clarified liquid from the secondary minerals precipitation chamber and settlers and are contacted with an ammonium bicarbonate solution in order to precipitate the rare earth carbonates.

10. The system of claim 9, further comprising a water conditioning plant receiving a rare earth carbonate concentrate and a liquid stream from the rare earth carbonates settlers.

11. The system of claim 10, wherein the water conditioning plant is operable for providing a stream of diluted elements water and an ammonium-concentrated stream.

12. The system of claim 1, wherein the at least one drying oven and at least one calcination oven comprises a plurality of drying furnaces that receive and dry the rare earth carbonates, and a plurality of calcination furnaces that convert the carbonates into rare earth oxides.

13. The system of claim 1, wherein the at least one dewatering table in contact with a water stream comprises a plurality of dewatering tables, connected in series, and in contact with a stream of wash water.

14. The system of claim 1, wherein the secondary system comprises a solid settler for fine solids separation, a secondary minerals precipitation chamber and settler, and a rare earth carbonates precipitation chamber and settler.

\* \* \* \* \*